Sept. 18, 1928.

A. O. BECKMAN

SIGNALING DEVICE

Filed May 7, 1927

1,684,659

Inventor
A. O. Beckman,

By Clarence A. O'Brien
Attorney

Patented Sept. 18, 1928.

1,684,659

UNITED STATES PATENT OFFICE.

ARNOLD ORVILLE BECKMAN, OF PASADENA, CALIFORNIA.

SIGNALING DEVICE.

Application filed May 7, 1927. Serial No. 189,675.

The present invention relates to improvements in signals and has reference more particularly to a simple and efficient means for association with any instrument which has a hand, dial, or other movable part which is regulated in its motion by a spring, whereby a signal will be automatically operated when the hand, dial, or other movable part has reached a predetermined position.

In the present instance, the invention is shown in association with the speedometer of a motor vehicle whereby the signal will be automatically operated when the rotatable speedometer dial has reached a predetermined position, thus indicating to the operator of the vehicle the rate of speed attained.

One of the important objects of the present invention is to provide a signaling device of the above mentioned character which includes a circuit closer of such construction as to permit the same to be readily and easily attached to the speedometer of the vehicle without necessitating any material alterations of the parts of the speedometer with which the circuit closer is to be associated, means being associated with the circuit closer for setting the same at any predetermined position so that the speed at which the signal is to operate may be regulated.

A further object of the invention is to provide a circuit closer which will at all times be positive and efficient in its operation as well as automatic, the device being applicable to many instruments, such as tachometers, electrical meters, pressure gauges, temperature recorders and the like.

A still further object is to provide a signaling device of the above mentioned character which is simple in construction, inexpensive, strong and durable, and further well adapted for the purpose for which it is designed.

Other objects and advantages of this invention will become apparent during the course of the following description.

In the accompanying drawing forming a part of this specification and in which like numerals designate like parts throughout the same, Figure 1 is a top plan view of the device embodying my invention showing the manner in which the same is associated with a speedometer, and also showing the electrical connection with a visual signal.

Figure 1:
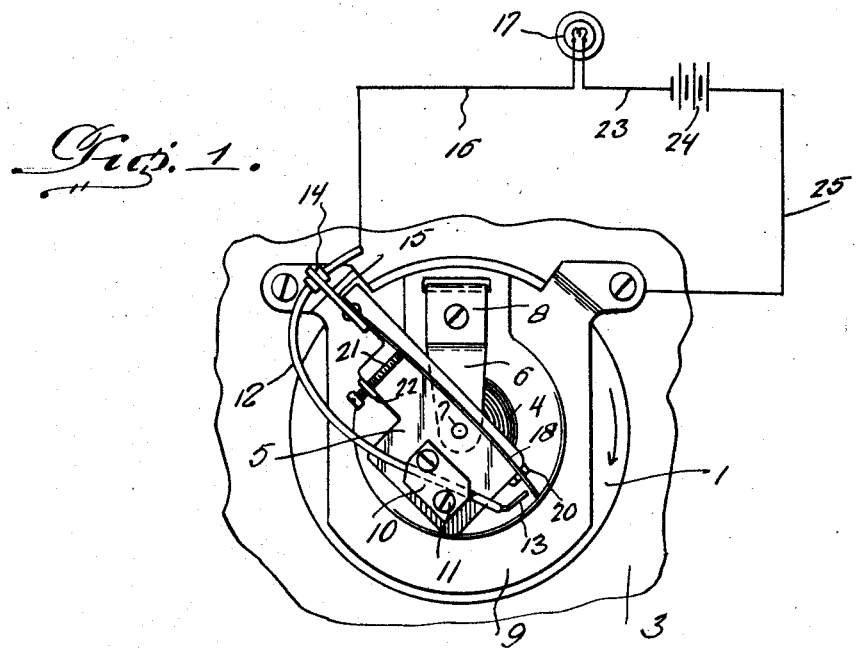

In the drawing wherein for the purpose of illustration is shown one embodiment of my invention, the numeral 1 designates the rotatable dial of a speedometer for motor vehicles, and the dial is formed with speed indicating graduations on its peripheral face in the manner well known in the art. The supporting bracket or frame for the rotatable dial 1 and its shaft 2 is shown at 3 and this is also of the conventional construction well known in the art. The shaft 2 extends upwardly through the dial 1 and the latter is keyed or otherwise fixedly secured on the shaft for rotation therewith.

The hair spring which is associated with a speedometer is disclosed at 4 and one end of this spring is secured to the upper end of the shaft 2. The other end of the spring 4 which is normally expanded is detached from the frame to which it is ordinarily connected and the same is adapted for connection to the movable contacts of the circuit closer, the construction of which will be hereinafter more fully described.

The present invention includes the provision of a plate 5 which is pivotally supported by and fastened to the inner end of the supporting arm 6, the pivot being illustrated at 7, in such a manner that the plate 5 may be manually rotated for adjustment, but will not thereafter rotate or swing under the action of the spring 4. This may be accomplished by a sufficiently firm screw which may be loosened for adjustment and then tightened to lock the plate 5 in position. This supporting arm 6 has its outer end disposed downwardly and thence laterally as at 8 for rigid attachment to the upper face of the top portion 9 of the supporting frame 3 as is clearly disclosed in the drawing, the upper end of the shaft 2 is disposed below the inner end portion of the supporting arm 6.

The plate 5 is adapted for manual rotation on the inner end of the supporting arm 6 so that the proper tension may be given to the spring 4 to cause the speedometer to read the correct speed, and is therefore held fixed in this position against the action of the spring 4. Arranged on the upper face of the plate 5 is the block 10 of insulating material and this block is secured on the plate through the medium of the screws 11. The block is formed with a longitudinally extending bore through which is disposed the inner end portion of a wire 12, the inner end being disposed laterally to provide what I term as a stationary contact 13. This contact is preferably constructed of non-corroding material. The outer end of this wire extends through an insulating bushing 14 which is mounted in the upstanding portion 15 formed at the outer end of the plate 5 and the outer end of this wire has connection wtih a suitable signal through the medium of a wire 16. The signal in the present instance constitutes an electric lamp and is adapted to be mounted on an instrument board of the motor vehicle in any appropriate manner so that the same may be readily observed by the driver of the vehicle. Though I have shown the signal as comprising a lamp 17, it is to be understood that I do not wish to limit myself to this particular type of signal. Any other character of signal may be employed for the purpose of indicating to the operator the speed at which the vehicle is traveling.

A resilient arm 18 in the form of a relatively narrow elongated strip of metal is secured at one end to the upstanding end 15 of the plate 5 and the free end of this arm extends beyond the opposite end of the plate and is disposed downwardly to provide a depending finger 19. This finger performs a two-fold function. In one instance, the finger provides a contact adjusted for cooperation with the stationary contact 13. The contact 19 is also formed of a noncorroding material.

Figure 2:
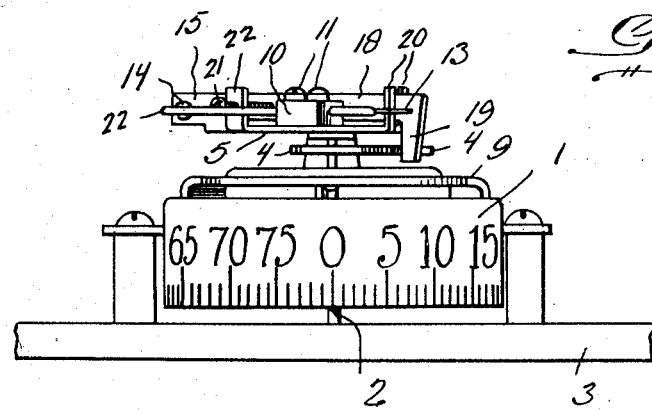
Figure 2 is a side elevation of the device.
Figure 3:
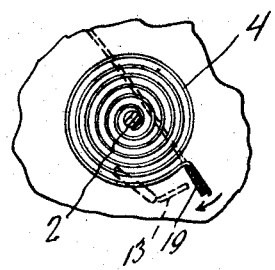
Figure 3 is a fragmentary detail of the main spring associated with the rotatable dial of the speedometer for more clearly disclosing the connection between the ends of the spring with the dial carrying shaft and the movable contact respectively.

Furthermore the finger 19 is adapted to be attached to the outer end of the expansible hair spring 4 by soldering or otherwise affixing the outer end of the spring to the lower end of the finger and this association of the finger with respect to the spring is clearly shown in Figure 3 of the drawing. A pair of upstanding narrowly spaced guides 20 are formed on the inner end of the plate 5 and the free end portion of the arm 18 is disposed between these guide members as is clearly shown in Figures 1 and 2.

The tension of the resilient movable contact arm 18 is regulated through the medium of the screw 21 which is threaded through an upstanding ear 22 provided therefor on one side of the plate 5, and the manner in which this screw cooperates with the movable contact arm 18 is clearly shown in Figures 1 and 2 of the drawing. The adjustment of the tension of the arm 18 is the means whereby the device is set so as to give the signal at the desired position of the dial.

A wire 23 forms communication between the lamp 17 and a suitable source of electric energy illustrated at 24 and a wire 25 connects the source of energy with the frame of the speedometer in a manner as is diagrammatically disclosed in Figure 1.

The operation of the device embodying my invention may be briefly stated as follows:

When the device is first installed, the plate 5 is adjusted manually so that the speedometer dial indicates the correct speeds. This adjustment is thereafter left unchanged. The device is adjusted to give a signal at any desired speed by turning the screw 21 until the contacts 19 and 13 are in engagement with each other when the dial indicates the desired speed. For lower speed, the contacts are out of engagement with each other and the circuit to the signal lamp 17 is opened.

Manifestly when the dial 1 of the speedometer rotates with the shaft 2 depending upon the speed at which the vehicle is traveling the spring 4 will be wound around the shaft and as this spring becomes contracted, the same will cause the finger 19 of the movable contact arm 18 to move inwardly toward the contact 13 and when the vehicle has reached the predetermined speed, the contacts will be in engagement with each other thereby closing the circuit to the lamp and warning the operator of the excessive rate of speed at which the vehicle is traveling.

Obviously as the speed of the vehicle decreases the spring 4 will expand and such operation will result in the movement of the finger 19 away from the stationary contact 13 thereby breaking the circuit to the signaling lamp 17. The provision of a signaling device of the above mentioned character will enable the same to be readily and easily associated with the speedometer of the conventional construction and furthermore will at all times be positive and efficient in its operation. Furthermore the signaling device will operate without affecting the sensitivity and accuracy of the instrument to which the same is attached and while I have shown the device as associated with a speedometer, the same may be equally applicable to any other instrument such as for example, a tachometer, electrical meter, pressure gauge, temperature recorder, and the like. In fact, the device may be associated with any instrument which has a hand, dial, or moving part of any sort which is regulated in its motion by springs similar to that shown at 4 in the drawing.

The simplicity in which my improved device is constructed enables the parts to be readily and easily assembled and will not necessitate any material alterations of the parts of the speedometer with which the device is to be associated.

5. While I have shown one embodiment of my invention, it is to be understood that various changes in the size, shape, and arrangement of parts may be resorted to without departing from the spirit or sacrificing any of the advantages of the appended claims.

Having thus described my invention, what I claim is:

1. In a circuit closer, the combination with a rotatable indicator and its supporting shaft, the supporting frame therefor, and a normally expanded spring operatively connected at one end to the shaft; of a plate supported above the frame adapted for manual adjustment in a horizontal plane, a stationary contact carried by the plate, a movable contact on the plate normally out of engagement with the stationary contact, the other end of the spring being secured to the movable contact whereby the contacts will be in engagement with each other when the indicator has rotated a predetermined distance.

2. In a circuit closer, the combination with a rotatable indicator and the supporting shaft therefor, the supporting frame therefor, and a normally expanded spring connected at one end to the shaft; of a plate adjustably mounted on the frame above the spring, a stationary contact secured on the plate and disposed beyond one end thereof, a movable contact arm secured at one end on the plate, the outer end of the arm being disposed downwardly beyond the end of the plate to provide a contact finger for cooperation with the outer end of the stationary contact, and being normally out of engagement therewith, the outer end of the spring being secured to the depending finger whereby the finger will be brought into engagement with the stationary contact when the rotatable indicator has rotated a predetermined distance.

3. In a circuit closer, the combination with a rotatable indicator, and the supporting shaft therefor, the supporting frame therefor, and a normally expanded coil spring connected at one end to the shaft, of a plate adjustably mounted on the frame above the spring, a stationary contact secured on the plate and disposed beyond one end thereof, a movable contact arm secured at one end on the plate, the outer end of the arm being disposed downwardly beyond the end of the plate to provide a contact finger for cooperation with the outer end of the stationary contact, and being normally out of engagement therewith, the outer end of the spring being secured to the depending finger whereby said finger will be brought into engagement with the stationary contact when the indicator has rotated a predetermined distance, and means for adjusting the movable arm.

4. In a circuit closer, the combination with a rotatable indicator and its supporting shaft, the supporting frame therefor and a normally expanded spring operatively connected at one end to the shaft, of a plate supported above the frame and adapted for manual adjustment in a horizontal plane, a stationary contact carried by the plate and disposed beyond one end thereof, a movable contact arm secured at one end on said plate, the outer end of the arm being disposed downwardly beyond the outer end of the plate to provide a contact finger for cooperation with the outer end of the stationary contact and being normally out of engagement therewith, the outer end of the spring being secured to the depending finger, whereby the finger will be brought into engagement with the stationary contact when the rotatable indicator has moved to a predetermined position, an upstanding ear formed on the plate adjacent the connected end of the movable contact arm, and an adjusting screw extending through said ear for engagement with the movable arm for adjusting the latter.

5. In a circuit closer of the class described comprising in combination a rotatable indicator, the supporting shaft therefor, the supporting frame therefor and the normally expanded coil spring connected at one end to the shaft, a plate supported above the frame and adapted for manual adjustment in a horizontal plane, a block secured on the plate, a wire extending through said block, the outer end of the wire projecting beyond the outer end of the plate to provide a stationary contact, a movable contact arm secured at one end on the plate adjacent the inner end thereof, the outer end of the arm being disposed beyond the outer end of the plate and directed downwardly to provide a contact finger for cooperation with the outer end of the stationary contact, and being normally out of engagement therewith, the outer end of the spring being secured to the depending finger whereby the latter will be brought into engagement with the stationary contact when the rotatable indicator has moved to a predetermined position, and an adjusting screw arranged on the plate for engagement with the movable contact arm for adjusting the same.

In testimony whereof I affix my signature.

ARNOLD ORVILLE BECKMAN.